United States Patent
Bolz

(10) Patent No.: US 9,384,570 B2
(45) Date of Patent: Jul. 5, 2016

(54) EFFICIENT SETUP AND EVALUATION OF FILLED CUBIC BEZIER PATHS

(71) Applicant: Nvidia Corporation, Santa Clara, CA (US)

(72) Inventor: Jeffrey A Bolz, Austin, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 236 days.

(21) Appl. No.: 14/028,042

(22) Filed: Sep. 16, 2013

(65) Prior Publication Data

US 2015/0077420 A1    Mar. 19, 2015

(51) Int. Cl.
*G06T 11/20* (2006.01)

(52) U.S. Cl.
CPC .................................. *G06T 11/203* (2013.01)

(58) Field of Classification Search
None
See application file for complete search history.

(56) References Cited

U.S. PATENT DOCUMENTS

| 2007/0097123 A1* | 5/2007 | Loop et al. ............... 345/442 |
| 2010/0322527 A1* | 12/2010 | Fablet et al. ............ 382/232 |
| 2011/0285736 A1* | 11/2011 | Kilgard .................... 345/584 |

OTHER PUBLICATIONS

Rueda et al., "GPU-based rendering of curved polygons using simplical coverings," Elsevier Ltd, 2008.*
Loop et al., "Resolution Independent Curve Rendering using Programmable Graphics Hardware," ACM, 2005.*

* cited by examiner

*Primary Examiner* — Kee M Tung
*Assistant Examiner* — Nicholas R Wilson

(57) ABSTRACT

A graphics processing system includes a central processing unit that processes a cubic Bezier curve corresponding to a filled cubic Bezier path. Additionally, the graphics processing system includes a cubic preprocessor coupled to the central processing unit that formats the cubic Bezier curve to provide a formatted cubic Bezier curve having quadrilateral control points corresponding to a mathematically simple cubic curve. The graphics processing system further includes a graphics processing unit coupled to the cubic preprocessor that employs the formatted cubic Bezier curve in rendering the filled cubic Bezier path. A rendering unit and a display cubic Bezier path filling method are also provided.

16 Claims, 2 Drawing Sheets

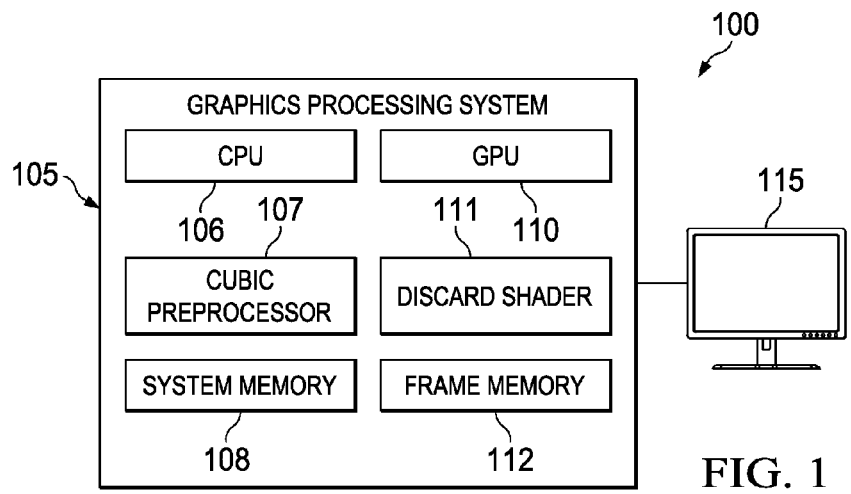
FIG. 1
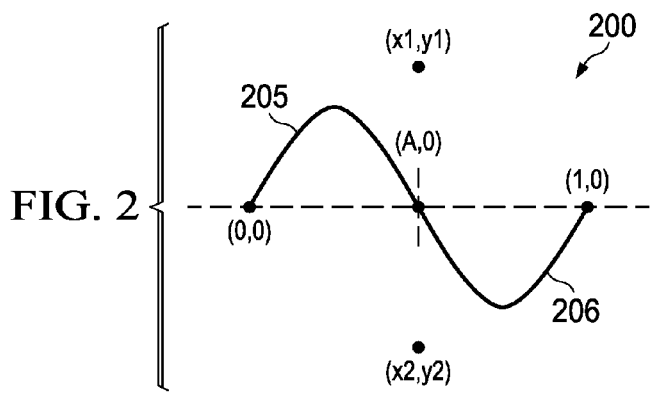
FIG. 2
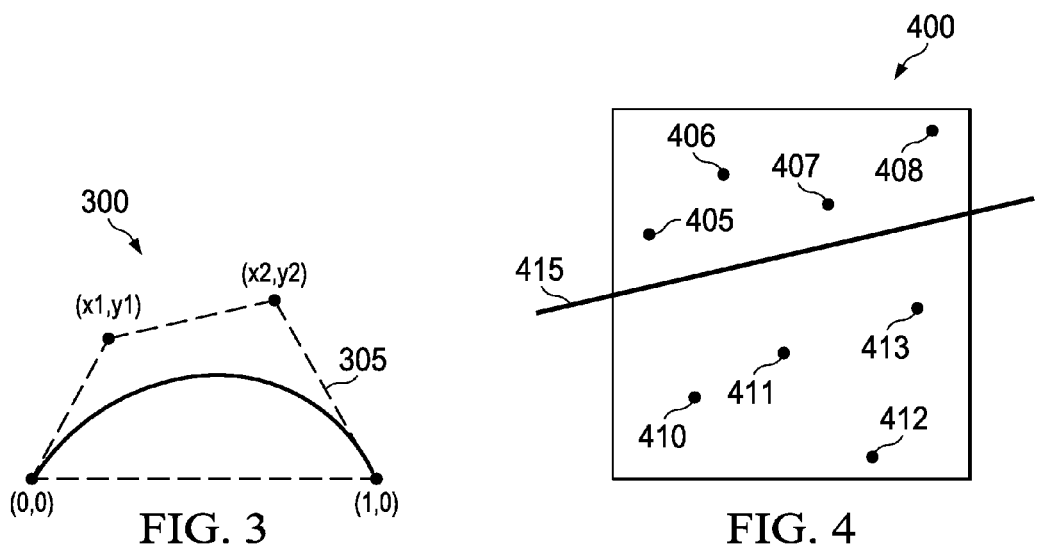
FIG. 3
FIG. 4

EFFICIENT SETUP AND EVALUATION OF FILLED CUBIC BEZIER PATHS

TECHNICAL FIELD

This application is directed, in general, to rendering a computer display and, more specifically, to a graphics processing system, a rendering unit and a display cubic Bezier path filling method.

BACKGROUND

Path rendering is a style of resolution-independent two dimensional (2D) rendering, often called "vector graphics," that is the basis for a number of important rendering standards. These rendering standards include PostScript, Java 2D, Quartz 2D, OpenVG, PDF, TrueType fonts, OpenType fonts and PostScript fonts, as well as drawings in Office file formats including PowerPoint and Adobe Illustrator illustrations, for example. Additionally, Internet applications include Scalable Vector Graphics (SVG), Silverlight and Adobe Flash for interactive web experiences and XML Paper Specification (XPS).

A path may be rendered into a frame buffer by first determining the coverage of the path in a stencil buffer and subsequently covering the stenciled region with bounding geometry that shades the covered pixels. Paths may include cubic Bezier curve segments and determining the coverage of filled cubic Bezier segments is a mathematically involved process. In a current practice of setting up texture coordinates, the cubic equation may be determined to be one of three curve types by classifying its roots wherein coefficients are themselves 3×3 matrix determinants of the original cubic equation control points. Improvements in evaluating filled cubic Bezier segments for rendering would be beneficial to the art.

SUMMARY

Embodiments of the present disclosure provide a graphics processing system, a rendering unit and a display cubic Bezier path filling method.

In one embodiment, the graphics processing system includes a central processing unit that processes a cubic Bezier curve corresponding to a filled cubic Bezier path. Additionally, the graphics processing system includes a cubic preprocessor coupled to the central processing unit that formats the cubic Bezier curve to provide a formatted cubic Bezier curve having quadrilateral control points corresponding to a mathematically simple cubic curve. The graphics processing system further includes a graphics processing unit coupled to the cubic preprocessor that employs the formatted cubic Bezier curve in rendering the filled cubic Bezier path.

In another aspect, the rendering unit includes a graphics processing unit configured to render a filled cubic Bezier path. Additionally, the rendering unit includes a shader coupled to the graphics processing unit and configured to format a cubic Bezier curve corresponding to the filled cubic Bezier path, wherein a formatted cubic Bezier curve provides quadrilateral control points corresponding to a mathematically simple cubic curve.

In yet another aspect, the display cubic Bezier path filling method includes subdividing a display cubic Bezier path into a set of cubic Bezier curves and formatting each of the set of cubic Bezier curves to provide a set of control points corresponding to a mathematically simple cubic curve. Additionally, the display cubic Bezier path filling method includes assigning texture coordinates to each of the set of control points for rendering each mathematically simple cubic curve and evaluating a pixel sample during rendering of each mathematically simple cubic curve for inclusion or exclusion in filling the display cubic Bezier path.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which:

FIG. 1 illustrates a block diagram of an embodiment of a graphics arrangement constructed according to the principles of the present disclosure;

FIG. 2 illustrates an example of a normalized cubic curve constructed according to the principles of the present disclosure;

FIG. 3 illustrates an example of a formatted cubic Bezier curve constructed according to the principles of the present disclosure;

FIG. 4 illustrates an example of a pixel geometry constructed according to the principles of the present disclosure;

DETAILED DESCRIPTION

Figure 5:
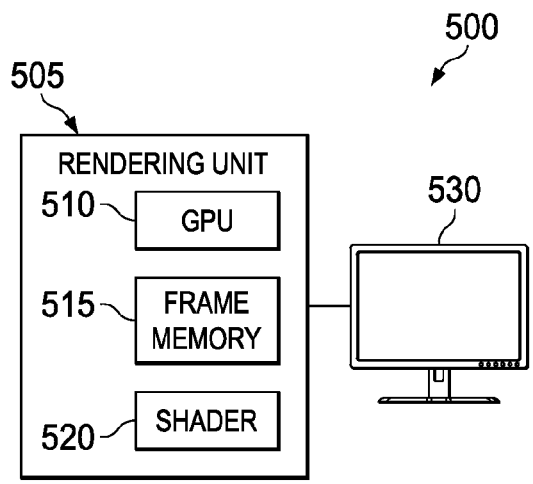
FIG. 5 illustrates an embodiment of a rendering system constructed according to the principles of the present disclosure.

A path is a two-dimensional (2D) collection of path segments, where a path segment is generally a line, a quadratic Bezier curve, a cubic Bezier curve or a partial elliptical arc (i.e., part of an ellipse or circle). One can basically think of a path as starting somewhere and then progressing to a destination based on a collection of controlling commands. Sometimes the path is closed by returning to its starting point. In rendering a filled path, pixel samples are determined to be inside or outside of the path based on the pixel sample's winding number (i.e., a number of times the path wraps around the pixel sample, incrementing and decrementing based on whether the wrapping is clockwise or counterclockwise), and a fill rule (e.g. is the winding number "non-zero" or "even or odd"). All pixel samples satisfying the winding rule are filled or colored during the rendering process. Paths often employ combinations of linked Bezier curves, since they are smooth curves that can be scaled indefinitely.

Embodiments of the present disclosure ultimately focus on improving the computational efficiency of determining the pixel samples that are within a filled cubic Bezier curve. This involves a set-up process (called "baking") and a rendering process, wherein the two processes may be split between a central processing unit (CPU) for baking and a graphics processing unit (GPU) for rendering. In this case, an overall algorithm is provided for a cubic Bezier curve that is computationally efficient to both bake on the CPU and to render on the GPU, especially for paths that are rendered only once. In another case, a shader associated with the GPU may be employed for baking with rendering supplied by the GPU.

Generally, minimal subdivision is performed on a cubic Bezier curve until it is mathematically simple. Cubic Bezier curves are often defined parametrically. For example:

$$x = f_1(t), \text{ and}$$

$$y = f_2(t),$$

where t is a common parameter that generally ranges from zero to one.

For purposes of this disclosure, a mathematically simple cubic curve is defined as one having only one "facingness" (e.g., concave in only one direction) for a monotonically increasing x(t). This simple cubic curve is defined by four control points. These four controls points are bounded by either a quadrilateral constructed from the four control points, or a triangle constructed from three of the control points (if one control point is inside the triangle formed by the other three). In either case, texture coordinates are assigned to each of these bounding control points, and discard shading evaluates whether pixel samples lie within the cubic Bezier curve, thereby filling it.

FIG. 1 illustrates a block diagram of an embodiment of a graphics arrangement, generally designated 100, constructed according to the principles of the present disclosure. In the illustrated embodiment, the graphics arrangement 100 includes a graphics processing system 105 and a local monitor 115. The graphics processing system 105 includes a central processing unit (CPU) 106, a cubic preprocessor 107, a system memory 108, a graphics processing unit (GPU) 110, a discard shader 111 and a frame memory 112.

The CPU 106 is coupled to the cubic preprocessor 107 and the system memory 108 and provides general computing processes and general control of operations for the graphics processing system 105. The system memory 108 includes long term memory storage (e.g., a hard drive) for computer applications and random access memory (RAM) to facilitate computation by the CPU 106. The GPU 110 is coupled to the CPU 106, the discard shader 111 and the frame memory 112. The GPU 110 provides monitor display and frame control of the local monitor 115.

In the illustrated embodiment, the CPU 106 is employed to process a cubic Bezier curve corresponding to a filled cubic Bezier path on the local monitor 115. The cubic preprocessor 107 is generally associated with the CPU 106 and formats the cubic Bezier curve to provide a formatted cubic Bezier curve having quadrilateral control points corresponding to a mathematically simple cubic curve. Providing the formatted cubic Bezier curve may generally correspond to normalizing, translating, scaling, rotating or subdividing the cubic Bezier curve. In one embodiment, the cubic preprocessor 107 may be a software module and may operationally reside in the system memory 108, the frame memory 110 or in portions of both. Alternately, the cubic preprocessor 107 may be implemented in hardware or a combination of software and hardware.

Initially, the CPU 106 reorients and scales the cubic Bezier curve (i.e., translates it) so that a first control point is located at the origin (0,0). It is rotated and scaled such that a last control point is at (1,0). The two intermediate control points, after this process, are referred to as (x1,y1) and (x2,y2), such that only four real variables are defining the shape of the formatted cubic Bezier curve.

Generally, a formatted cubic Bezier curve cannot intersect the line between the first and last control points. This condition may be rectified by subdividing where it crosses the line between the first and last control points. A formatted cubic Bezier curve cannot have a loop, which would occur if abscissa values (x-values) are not monotonically increasing. Loops generate both positive and negative regions during a filling operation and are computationally complicated. So, to avoid loops, the cubic Bezier curve is subdivided. Additionally, x1 and x2 are required to be in the range of zero to one, which can also be accomplished by subdivision. In practice, the average number of subdivision operations required per path segment is much less than one for most content.

The formatted cubic Bezier curve is provided to the GPU 110 from the cubic preprocessor 107 for further processing in rendering the filled cubic Bezier path. Here, the discard shader 111 is employed in evaluating a pixel sample to determine if the pixel sample is included or excluded in the filled cubic Bezier path.

During rendering, an anti-aliasing algorithm provides multi-sampling within each pixel. For each pixel, samples are provided having assigned color values thereby providing the possibility of samples having different color values within each pixel. Then, at the end of a frame construction, all pixel samples within the pixel are blended together. For example, if a pixel is partially covered, it may have 50 percent from one color and 50 percent from another color, which makes the edge between the two blend more smoothly.

A pseudocode example for a baking process corresponding to the principles of the present disclosure is presented below in Tables 1A, 1B, 1C and 1D. The first four lines (Table 1A) are translating the cubic Bezier curve so that the first control point is at (0,0). There are a few lines in the middle (Table 1B) where dividing by the length of control point three is accomplished, which basically makes control point three a distance of one away from the origin where the first control point is located. Then, a 2×2 matrix is formed (Table 1C), which rotates the points so that control point three is on the X-axis and at (1,0). Finally, a 2×2 matrix multiply is accomplished (Table 1D).

TABLE 1A

Pseudocode Example for CPU Baking

```
op[0] = points[0] – points[0];
op[1] = points[1] – points[0];
op[2] = points[2] – points[0];
op[3] = points[3] – points[0];
if (length(op[3]) == 0) { // loop
splitCubicPathSegment(points, 0.5);
return;
}
```

TABLE 1B

Pseudocode Example for CPU Baking

```
op[1]  /= length(op[3])
op[2]  /= length(op[3]);
op[3]  /= length(op[3]);
```

TABLE 1C

Pseudocode Example for CPU Baking

```
// rotation is cheap - op3 gives us the matrix!
float cosangle = op[3].x;
float sinangle = –op[3].y;
float2x2 u = float2x2(cosangle, –sinangle,
                      sinangle, cosangle);
```

TABLE 1D

Pseudocode Example for CPU Baking

```
op[1] = mul(u,op[1]);
op[2] = mul(u,op[2]);
op[3] = mul(u,op[3]);
// apply splitting tests based on op[1].xy and op[2].xy
```

FIG. 2 illustrates an example of a normalized cubic curve, generally designated 200, constructed according to the principles of the present disclosure. The normalized cubic curve 200 is representative of an arbitrary cubic curve having control points (p0, p1, p2, p3), where p0 and p3 are end control points (anchors) and p1 and p2 are intermediate control points (handles).

The normalized cubic curve 200 is formed in an X-Y planar coordinate system by translating the arbitrary cubic curve such that the control point p0 is located at a position (0,0) on an X-axis, as shown. Then, the arbitrary cubic curve is scaled and rotated such that the control point p3 is located at a position (1,0) along the X-axis. In the example illustrated, this places the intermediate control points p1 and p2 at corresponding positions (x1,y1) and (x2,y2), which results in the normalized cubic curve 200 being serpentine-shaped and therefore, not a mathematically simple cubic curve. However, subdivision of the normalized cubic curve 200 at the point (A,0) provides first and second cubic curve portions 205, 206 that are mathematically simple.

Generally, if the product of y1 and y2 is negative (i.e., y1*y2<0), then the curve is subdivided at a point y1/(y1-y2), where $f_2(t)$ intersects 0. If the curve is a loop (i.e., x2<x1), the loop is subdivided at t=0.5. Additionally, the curve may be recursively subdivided into simple curves, if needed. These may be further formatted to provide formatted cubic Bezier curves that are mathematically simple.

FIG. 3 illustrates an example of a formatted cubic Bezier curve, generally designated 300, constructed according to the principles of the present disclosure. The mathematically simple, formatted cubic Bezier curve 300 does not cross the line (0,0)-(1,0) (i.e., y1 and y2 have the same sign). The control points (0,0), (x1,y1), (x2,y2), (1,0) provide a quadrilateral bounding shape 305 that completely bounds the formatted cubic Bezier curve 300 and defines its mathematically simple shape. Here, x1 is greater than zero and x2 is less than one. Therefore, the formatted cubic Bezier curve 300 is a simple, well-behaved curve having only one facingness that is defined by the quadrilateral bounding shape 305.

The quadrilateral bounding shape 305 also defines an object space, and when it is displayed on a screen (e.g., the display monitor 115), the resulting curve may be smaller than a pixel, or it can fill a large portion of the whole screen thereby engaging a large number of pixels. For either case, mathematical approximations may be employed, which allow calculations for pixel sample testing to be simplified for enhanced computational efficiency.

Texture coordinates are assigned to the control points (0,0), (x1,y1), x2,y2), (1,0), and the texture coordinates are rendered and interpolated by a GPU (e.g., the GPU 110). Recall that Bezier curves are typically defined mathematically as two parametric equations x(t) and y(t), where t ranges from zero to one. The actual parametric equations are determined by the control points (texture coordinates). An interpolated pixel sample (Xs,Ys) exists, which corresponds to a value of t (i.e., t(Xs)) that can be calculated. This may be accomplished by inverting the function x(t) and basically solving for t when x(t)=Xs. That is, compute $t=x^{-1}(Xs)$. This may be accomplished approximately by employing a Bisection or Newton's method.

Once this value of t is determined, the value of y(t) can be computed along the curve recalling that x(t) and y(t) are cubic functions. This gives an approximation of the Y-coordinate ($Y_{approx}$) corresponding to the t-coordinate and the X-coordinate for this interpolated sample. Now, this pixel sample's Y-value Y(s) and the curve's Y-value $Y_{approx}$ are known, and the two can be compared to determine if this sample is above or below the formatted cubic Bezier curve.

FIG. 4 illustrates an example of a pixel geometry, generally designated 400, constructed according to the principles of the present disclosure. The pixel geometry 400 includes a collection of pixel samples within a pixel wherein pixel samples 405, 406, 407, 408 fall outside a cubic Bezier curve 415, and pixel samples 410, 411, 412, 413 fall inside the cubic Bezier curve 415.

The cubic Bezier curve 415 is representative of a formatted cubic Bezier curve that may be approximated as a straight line within a pixel when the curve, after being projected to the screen, is large compared to the pixel. This allows a solution for a formatted cubic Bezier curve to be amortized across all samples within the pixel. If the curve is not large compared to the pixel, then the above algorithm may be applied to each sample in the pixel. Here, the solution is applied for one sample, and then derivatives are analytically evaluated to approximate corresponding parametric functions at other sample points using linear extrapolation. This approach provides an optimization for the approach discussed with respect to FIG. 3.

Initially, the solution discussed with respect to FIG. 3 is employed to obtain a value of t corresponding to one of the samples within the pixel. Then, a linear approximation of the curve obtained in that neighborhood is employed to determine if the rest of the samples are above or below it. Cubic polynomials define the curve and determining the slope of the curve is mathematically simple, since it is obtained using the first derivative (dy/dx) evaluated at the sample selected. The Bernstein basis is a standard form of the polynomials defining the parametric equations for Bezier curves. This provides the slope of the linear approximation of the curve in the neighborhood of the pixel. Then, for the remaining samples in the pixel, it is determined if they are above or below the line defining the cubic curve. This entails taking the slope (dy/dx)*(x−x0)+y0, which is very fast to evaluate.

If the curve is much larger than one pixel, this approximation works well. A fragment shader employed with a GPU is able to detect the size of the curve relative to the size of the pixel using instructions denoted as DDX/DDY. For neighboring pixels and specifically for this case, corresponding texture coordinates are subtracted in adjacent pixels to give an approximation of the derivative of the texture coordinate. This provides a sense of scale for how large the original geometry was when compared to the pixel size. The terms DDX and DDY are representative of differences and DDX/DDY represents a first difference that subtracts corresponding values in adjacent pixels to approximate derivatives.

FIG. 5 illustrates an embodiment of a rendering system, generally designated 500, constructed according to the principles of the present disclosure. The rendering system 500 includes a rendering unit 505 and a display monitor 530. The rendering unit 505 includes a GPU 510, a shader 520 and a frame memory 515.

The process of assigning texture coordinates based on normalized coordinates can be performed either on a CPU or in a vertex shader (e.g., the shader 520) associated with the GPU

510. In this latter case, a CPU (not shown) is only required to determine whether curve subdividing is necessary and then provide corresponding control points to a vertex buffer. In an alternate embodiment, the subdividing may be accomplished in the vertex shader, a tessellation shader or geometry shader associated with the GPU 510.

The required texture coordinates are basically the object space control point positions for a required curve, which are computationally efficient to generate, as shown before. The first and last texture coordinates are always (0,0) and (1,0) and the two intermediate texture coordinates are formed by translating and rotating the cubic Bezier curve, which are very efficient operations computationally.

In a further optimization, the vertex shader can actually derive the texture coordinates from the control point locations thereby performing the same calculation as a CPU does in another embodiment. The vertex shader scales, translates and rotates the curve employing the GPU 510 instead of on a CPU. A benefit of this approach is not having to store the texture coordinates. The control point positions are stored, and the vertex shader then determines the texture coordinates from these control point positions.

Figure 6:
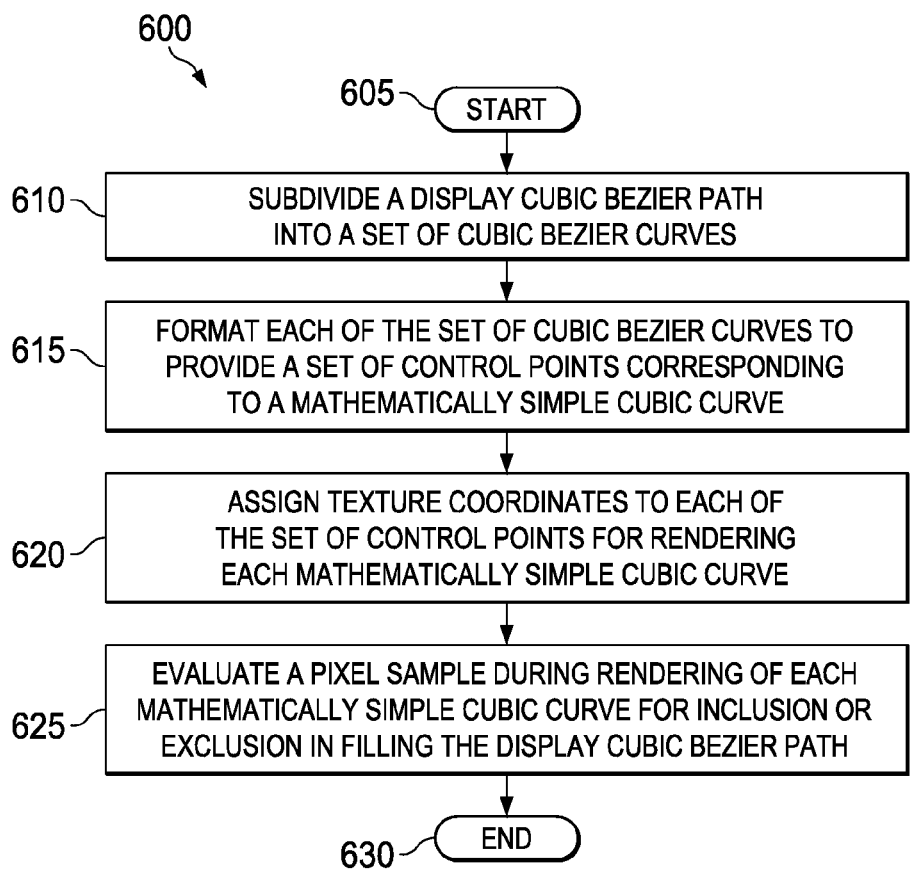
FIG. 6 illustrates an embodiment of a display cubic Bezier path filling method carried out according to the principles of the present disclosure.

FIG. 6 illustrates an embodiment of a display cubic Bezier path filling method, generally designated 600, carried out according to the principles of the present disclosure. The method 600 starts in a step 605, and in a step 610, a display cubic Bezier path is optionally subdivided into a set of cubic Bezier curves. Then, each of the set of cubic Bezier curves is formatted to provide a set of control points corresponding to a mathematically simple cubic curve, in a step 615. Texture coordinates are assigned to each of the set of control points for rendering each mathematically simple cubic curve, in a step 620. And, a pixel sample is evaluated during rendering of each mathematically simple cubic curve for inclusion or exclusion in filling the display cubic Bezier path, in a step 625.

In one embodiment, formatting each of the set of cubic Bezier curves includes normalizing, translating, scaling or rotating each of the set of cubic Bezier curves. In another embodiment, assigning texture coordinates to each of the set of control points includes using the set of control points as texture coordinates. In yet another embodiment, evaluating the pixel samples includes discard shading of the pixel sample that involves solving a cubic equation describing the mathematically simple cubic curve to determine inclusion or exclusion of the pixel sample within the display cubic Bezier path. Correspondingly, solving the cubic equation may include an approximate or iterative solution. Additionally, the approximate or iterative solution may include computing an ordinate value of the mathematically simple cubic curve that is compared to an interpolated ordinate value of the pixel sample. The approximate or iterative solution may include a local linear approximation of the mathematically simple cubic curve that intersects at least two pixels. The method 600 ends in a step 630.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A display cubic Bezier path filling method, comprising:
   subdividing a display cubic Bezier path into a set of cubic Bezier curves;
   formatting each of the set of cubic Bezier curves to provide a set of control points corresponding to a mathematically simple cubic curve, wherein the display cubic Bezier path is subdivided until the set of control points for each of the set of cubic Bezier curves have monotonically increasing coordinates with respect to a line joining first and last control points, wherein each of the set of cubic Bezier curves is translated so that the first control point is located at an origin (0,0) and is rotated and scaled such that the last control point is at (1,0);
   assigning texture coordinates to each of the set of control points for rendering each mathematically simple cubic curve; and
   evaluating a pixel sample during rendering of each mathematically simple cubic curve for inclusion or exclusion in filling the display cubic Bezier path.

2. The method as recited in claim 1 wherein assigning texture coordinates to each of the set of control points includes using the set of control points as texture coordinates.

3. The method as recited in claim 1 wherein evaluating the pixel sample includes discard shading of the pixel sample that involves solving a cubic equation describing the mathematically simple cubic curve to determine inclusion or exclusion of the pixel sample.

4. The method as recited in claim 3 wherein solving the cubic equation includes an approximate or iterative solution.

5. The method as recited in claim 4 wherein the approximate or iterative solution includes computing an ordinate value of the mathematically simple cubic curve that is compared to an interpolated ordinate value of the pixel sample.

6. The method as recited in claim 4 wherein the approximate or iterative solution includes a local linear approximation of the mathematically simple cubic curve that intersects at least two pixels.

7. A graphics processing system, comprising: a central processing unit that processes a cubic Bezier curve corresponding to a filled cubic Bezier path; and
   a cubic preprocessor coupled to the central processing unit that formats the cubic Bezier curve to provide a formatted cubic Bezier curve having quadrilateral control points corresponding to a mathematically simple cubic curve, wherein the cubic Bezier curve is subdivided until the quadrilateral control points of the formatted cubic Bezier curve have monotonically increasing coordinates with respect to a line joining first and last control points, wherein the formatted cubic Bezier curve is translated so that the first control point is located at an origin (0,0) and is rotated and scaled such that the last control point is at (1,0); and
   a graphics processing unit coupled to the cubic preprocessor that employs the formatted cubic Bezier curve in rendering the filled cubic Bezier path.

8. The system as recited in claim 7 wherein the quadrilateral control points of the formatted cubic Bezier curve are employed as texture coordinates in rendering the filled cubic Bezier path.

9. The system as recited in claim 8 wherein a discard shader solves a cubic equation describing the mathematically simple cubic curve to determine if a pixel sample lies within or outside of the formatted cubic Bezier curve.

10. The system as recited in claim 9 wherein solving the cubic equation includes providing an approximate or iterative solution that computes an ordinate value of the mathematically simple cubic curve and compares it to an interpolated ordinate value of a pixel sample.

11. The system as recited in claim 9 wherein solving the cubic equation includes providing a local linear approximation of the mathematically simple cubic curve that intersects at least two pixels.

12. A rendering unit, comprising:
a graphics processing unit configured to render a filled cubic Bezier path; and
a shader coupled to the graphics processing unit and configured to format a cubic Bezier curve corresponding to the filled cubic Bezier path, wherein a formatted cubic Bezier curve provides quadrilateral control points corresponding to a mathematically simple cubic curve, wherein the cubic Bezier curve is subdivided until the quadrilateral control points of the formatted cubic Bezier curve have monotonically increasing coordinates with respect to a line joining first and last control points, wherein the formatted cubic Bezier curve is translated so that the first control point is located at an origin (0,0) and rotated and scaled such that the last control point is at (1,0), and wherein the rendering unit employs the formatted cubic Bezier curve in rendering the filled cubic Bezier path.

13. The rendering unit as recited in claim 12 wherein the shader is a vertex shader, a tessellation shader, or a geometry shader.

14. The rendering unit as recited in claim 12 wherein the quadrilateral control points of the formatted cubic Bezier curve are employed as texture coordinates in rendering the filled cubic Bezier path.

15. The rendering unit as recited in claim 14 wherein an approximate or iterative solution describing the mathematically simple cubic curve determines if a pixel sample lies within or outside of the filled cubic Bezier path.

16. The rendering unit as recited in claim 14 wherein an approximate or iterative solution describing the mathematically simple cubic curve determines a local linear approximation that intersects at least two pixels.

* * * * *